US006384939B1

United States Patent
Honda et al.

(10) Patent No.: US 6,384,939 B1
(45) Date of Patent: *May 7, 2002

(54) IMAGE PROCESSING APPARATUS AND METHOD FOR ADJUSTMENT OF DENSITY OF COPIED IMAGE

(75) Inventors: Takashi Honda, Toyokawa; Yoko Fujiwara, Tokyo, both of (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/636,643

(22) Filed: Apr. 23, 1996

(30) Foreign Application Priority Data

Apr. 28, 1995 (JP) .............................. 7-106166

(51) Int. Cl.[7] ................................ H04N 1/04
(52) U.S. Cl. ................ 358/474; 358/448; 358/461
(58) Field of Search ................ 395/106, 109, 395/110; 358/474, 461, 462, 445, 486, 487, 475, 448, 296, 517; 355/208, 243, 38, 69; 399/39, 42, 85, 138

(56) References Cited

U.S. PATENT DOCUMENTS

| 4,591,264 A | | 5/1986 | Ueda et al. |
| 4,707,120 A | * | 11/1987 | Yamamoto ................ 355/208 |
| 4,733,306 A | * | 3/1988 | Matsunawa et al. ....... 358/474 |
| 4,837,450 A | | 6/1989 | Satomura et al. |
| 4,950,894 A | * | 8/1990 | Hara et al. ................ 250/327.2 |
| 5,053,808 A | * | 10/1991 | Takagi ........................ 355/38 |
| 5,075,788 A | * | 12/1991 | Funada ....................... 358/462 |
| 5,079,638 A | * | 1/1992 | Kishi et al. ................. 358/448 |
| 5,132,788 A | * | 7/1992 | Hirota ........................ 358/448 |
| 5,185,668 A | * | 2/1993 | Ohta .......................... 358/445 |
| 5,214,294 A | * | 5/1993 | Toyofuku .................... 250/561 |
| 5,303,006 A | * | 4/1994 | Mizude ...................... 355/208 |
| 5,428,425 A | * | 6/1995 | Miyamoto .................. 355/208 |
| 5,454,053 A | * | 9/1995 | Okubo et al. .............. 382/270 |
| 5,523,861 A | * | 6/1996 | Tanaka et al. ............. 358/475 |
| 5,568,270 A | * | 10/1996 | Endo .......................... 358/474 |
| 5,579,090 A | * | 11/1996 | Sasanuma et al. ......... 358/521 |
| 5,608,823 A | * | 3/1997 | Ohtani ....................... 382/271 |

* cited by examiner

Primary Examiner—Mark Wallerson
(74) Attorney, Agent, or Firm—Burns, Doane, Swecker & Mathis, LLP

(57) ABSTRACT

This invention causes an image which has been read out by a CCD sensor during a first scan to be converted into an electric signal corresponding to the density of the image. A CPU forms by calculation a graph of the magnitude of density and the frequency thereof, namely a density histogram based on the electric signal obtained by the conversion. The contrast of the image is calculated, based on the density of the blank base part and that of the image formed part of the image which are calculated from the density histogram. The CPU sets the adjustment width based on this contrast and calculates the luminous energy of a lamp being used during a main scan in accordance with the adjustment width so set and the value of density set by a setting key. Thus, the present invention infallibly allows perfect density adjustment in an image of any degree of contrast.

34 Claims, 9 Drawing Sheets

CONCEPTUAL DIAGRAM OF CONSTRUCTION OF SYSTEM (PC-SCANNER)

CONCEPTUAL DIAGRAM OF CONSTRUCTION OF SYSTEM (SYSTEM-LBP)

HISTOGRAM (WITH CONTRAST)

HISTOGRAM (WITHOUT CONTRAST)

SETTING OF AE FINE ADJUSTMENT

IMAGE PROCESSING APPARATUS AND METHOD FOR ADJUSTMENT OF DENSITY OF COPIED IMAGE

BACKGROUND OF THE INVENTION

1. Field of the Invention

This invention relates to an image processing apparatus such as, a microfilm scanner and a copying device and to a method for density adjustment of a copied image. More particularly, this invention relates to an apparatus and a method which are adapted to permit automatic modification of the amount of change in density per unit step during the formation of an image in conformity with the contrast of an original image (inclusive of a film or an original document).

2. Description of the Prior Art

The microfilm scanner in popular use to date, for example, performs a pre-scan on a given film as an original image and, based on the outcome of the pre-scan, determines an exposure level for the formation of a copied image of desired density for the purpose of obtaining a copied image of high quality.

Incidentally, the amount of change in density per step of the exposure level is generally fixed at a constant value. The exposure level necessary for obtaining a copied image of desired density, however, is possibly variable with the kind of the film bearing a photographed original image, such as a negative film and a positive film. To cope with this variation, some devices have been adapted to permit variation of the amount of change in density per step of the exposure level in conformity with the kind of film as disclosed by the invention of U.S. Pat. No. 4,591,264, for example.

Although the conventional image processing apparatus embodying this principle is so adapted as to permit modification of the amount of change in density per step of the exposure level in conformity with the kind of film, the amount of change in density per step of the exposure level is fixed at a constant value for similar films. If the amount of change in density per step is adequately set for films of high contrast, for example, it will cause the films of low contrast which are similar to the films of high contrast, to incur the following inconveniences.

When a film (1) having a contrast of 1.0 and a film (2) having a contrast of 0.3 are selected to be darkened each by one step, where the amount of change in density per step is fixed at 0.1, for example, the one step in the film (1) relative to the contrast of film equals the change in density shown below:

$$0.1/1.0 = 1/10$$

The density of the copy, therefore, turns out to be a gradually darkening output as compared with the copy density existing before the setting of the exposure level.

Meanwhile, the one step in the film (2) relative to the contrast of film equals the change in density shown below:

$$0.1/0.3 = 1/3$$

The density of the copy, therefore, turns out to be a suddenly darkening output as compared with the copy density existing before the setting of the exposure level.

As a result, the operator inevitably incurs an inconvenience of finding no way of setting the density at a medium value between step 0 and step 1 in spite of the most likely possibility of demanding an exposure level equivalent to this medium value.

When this situation is completely reversed, the possibility of the operator likewise experiencing an inconvenience is undeniable. Specifically, this is the case in which the amount of change in density per step turns out to be adequate for films of low contrast.

When a film (3) having a contrast of 0.3 and a film (4) having a contrast of 1.2 are elected to be darkened each by one step where the amount of change in density per step is fixed at 0.03, for example, the one step in the film (3) relative to the contrast of film equals the change in density shown below:

$$0.03/0.3 = 1/10$$

The density of copy, therefore, turns out to be a gradually darkening output as compared with the copy density existing before the setting of the exposure level.

Meanwhile, the one step in the film (4) relative to the contrast of film equals the change in density shown below:

$$0.03/1.2 = 1/40$$

The density of copy, therefore, turns out to be an extremely feeble darkening output as compared with the copy density existing before the setting of the exposure level.

As a result, the operator is compelled to make a change involving a large number of steps. Since the number of steps available at all for the change is limited, he inevitably confronts a difficulty contrary to the hardship mentioned above, i.e. an inconvenience of finding no way of elevating the density to a required level.

The occurrence of such inconveniences as mentioned above leads to disruption of the uniformity of change in density per step of the exposure level between original images abounding in contrast and original images lacking contrast to a point where the operator will experience difficulty in adjusting the exposure level for the purpose of obtaining copied images of desired density.

SUMMARY OF THE INVENTION

It is an object of this invention to provide an image processing apparatus which adjusts the change in density per step of the exposure level for a given original image to suit the contrast of the original image, no matter whether the contrast may be high or low.

To fulfill the object mentioned above, the image processing apparatus according to the present invention comprises an image reading means for reading out an original image and outputting an electric signal corresponding to the density of the original image so read out, contrast calculating means for calculating the contrast of the image based on the electric signal outputted by the image reading means, density setting means for setting desired density within a prescribed adjustment width, adjustment width setting means for setting the adjustment width of the density setting means based on the contrast calculated by the contrast calculating means, and density adjusting means for controlling the electric signal outputted from the image reading means in accordance with the value of density set by the density setting means and thereby adjusting the density.

By adopting the construction described above, it is made possible to set the adjustment width of copy density based on the contrast of the original image read out and use the density adjusting means effectively for implementing adequate density adjustment for an original image of any degree of contrast.

It is another object of this invention to provide a method for effecting density adjustment in an image processing apparatus which enables the change in density per step of the exposure level to be adjusted to suit the contrast of an original image.

To fulfill the object mentioned above, the method for density adjustment according to the present invention is used in an image reading apparatus adapted to have a prescribed adjustment width divided into a plurality of steps and provided with density setting means capable of setting amounts of density adjustment stepwise depending on the number of steps to be set, which method comprises a first scan step for reading out an original image by the use of image reading means and outputting an electric signal corresponding to the density of the original image, a histogram forming step for forming a density histogram based on the electric signal corresponding to the density obtained in the first scan step, a contrast calculating step for calculating a contrast based on the density histogram, a density adjustment amount setting step for enabling density setting means to set the amount of density adjustment in one step based on the contrast, a density adjusting step for controlling an electric signal outputted from reading means in accordance with the amount of density adjustment set by the density setting means and thereby adjusting the density, and a second scan step for reading out the original image again and outputting an electric signal using the state of density setting.

The method described above allows the density of an image of a copy to be invariably adjusted to an adequate level because it commences the second scan after detecting the trend of the density of an original image in the first scan, forming a density histogram in response to this trend, discerning the contrast of the image from the density of the blank base part and the image formed part, and then setting the amount of density adjustment in one step based on the contrast.

DETAILED DESCRIPTION OF THE PREFERRED EMBODIMENT

Figure 1B:
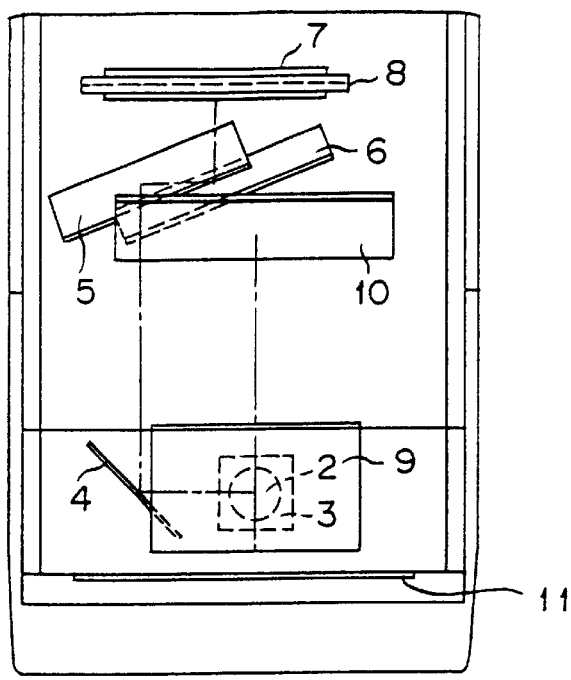
FIGS. 1(A), (B) and (C) are a side view, a plan view and an elevational view respectively showing schematically a microfilm scanner as an image processing apparatus according to the present invention.
Figure 1C:
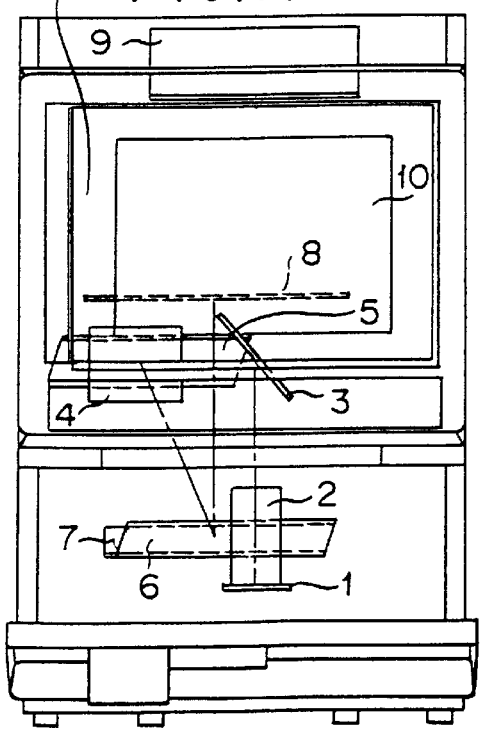

A microfilm scanner shown in FIG. 1, which is an image processing apparatus according to this invention, is generally used for projecting a microfilm on a screen by means of a lamp and lenses. The microfilm scanner is adapted to read out the projected image electrically in response to the instruction of an operator.

Figure 1A:
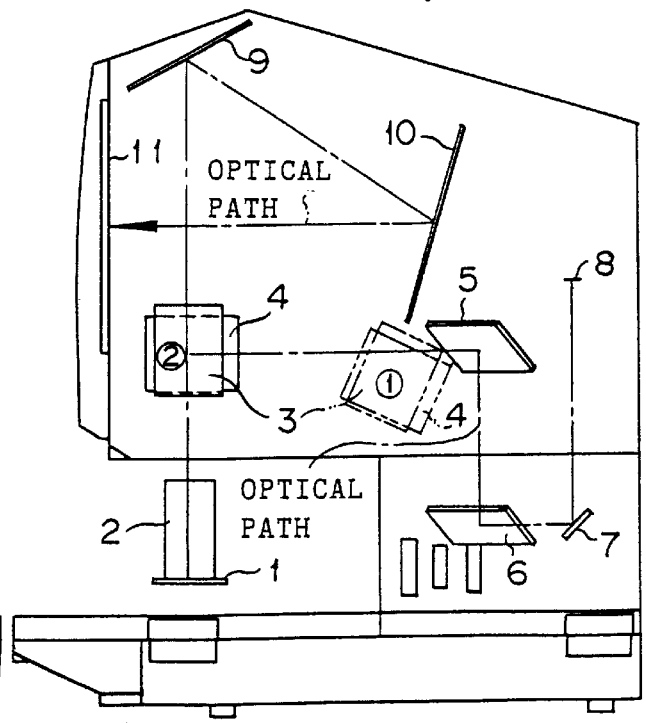

When this microfilm scanner is used as a reader, a scanner mirror 3 is retracted to the position (1) as shown in FIG. 1(A) to avoid standing on the light path through which the light from a film 1 travels to a screen 11. An original image, namely the photographed image of the film 1 is projected on the screen 11 via the light path a which is formed with a lens 2, a first reader mirror 9 and a second reader mirror 10.

When the operator gives an instruction to scan, the microfilm scanner functions as a scanner. In this case, the scan mirror 3 moves from the position (1) to the position (2) and forms a light path for the light from the film 1 to reach a line sensor 8. The original image is projected on the line sensor 8 via the light path b which is formed with the lens 2, the scan mirror 3, a first scan mirror 4, a second scan mirror 5, a third scan mirror 6 and a fourth scan mirror 7. The scan mirror 3, when gradually rotated, causes the film to be scanned and, as a result, the line sensor 8 outputs image data.

Figure 2A:
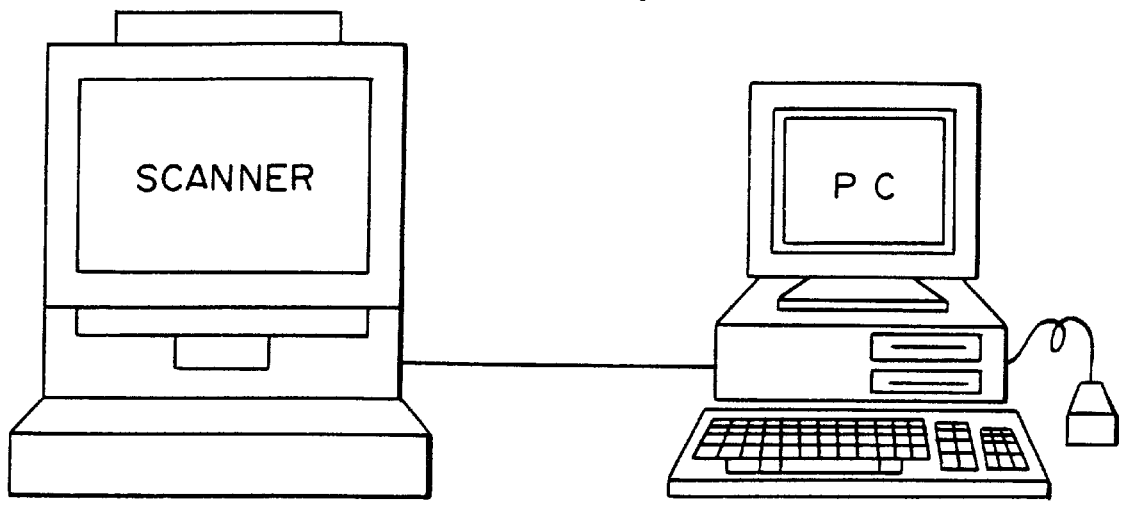
FIGS. 2(A) and (B) are conceptual diagrams illustrating a system construction of the image processing apparatus according to this invention.
Figure 2B:
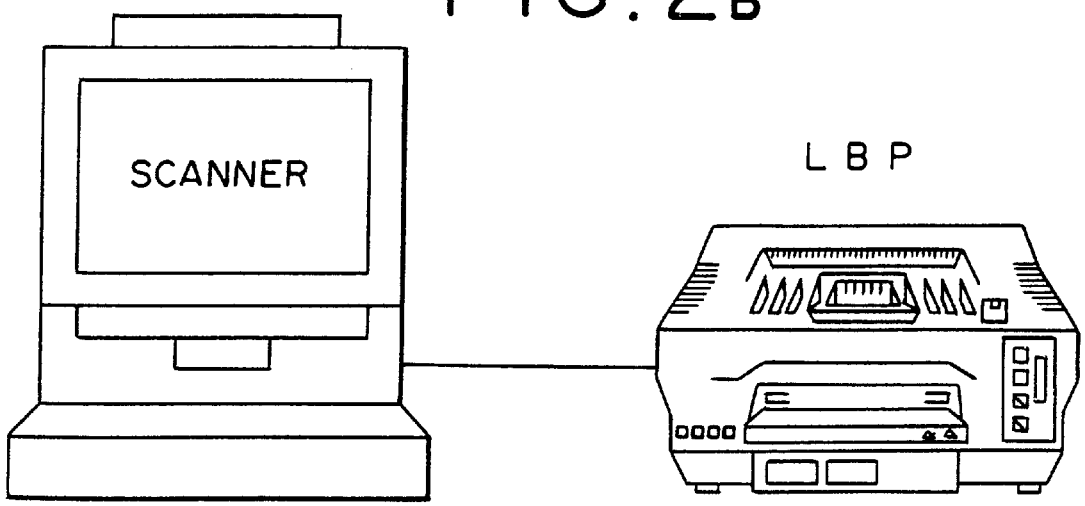

The microfilm scanner functions as an input device. When this microfilm scanner is connected to a computer as shown in FIG. 2(A), the image data are outputted into this computer. When the microfilm scanner is connected to a laser beam printer (LBP) as shown in FIG. 2(B), the image data are outputted into the LBP.

Figure 3:
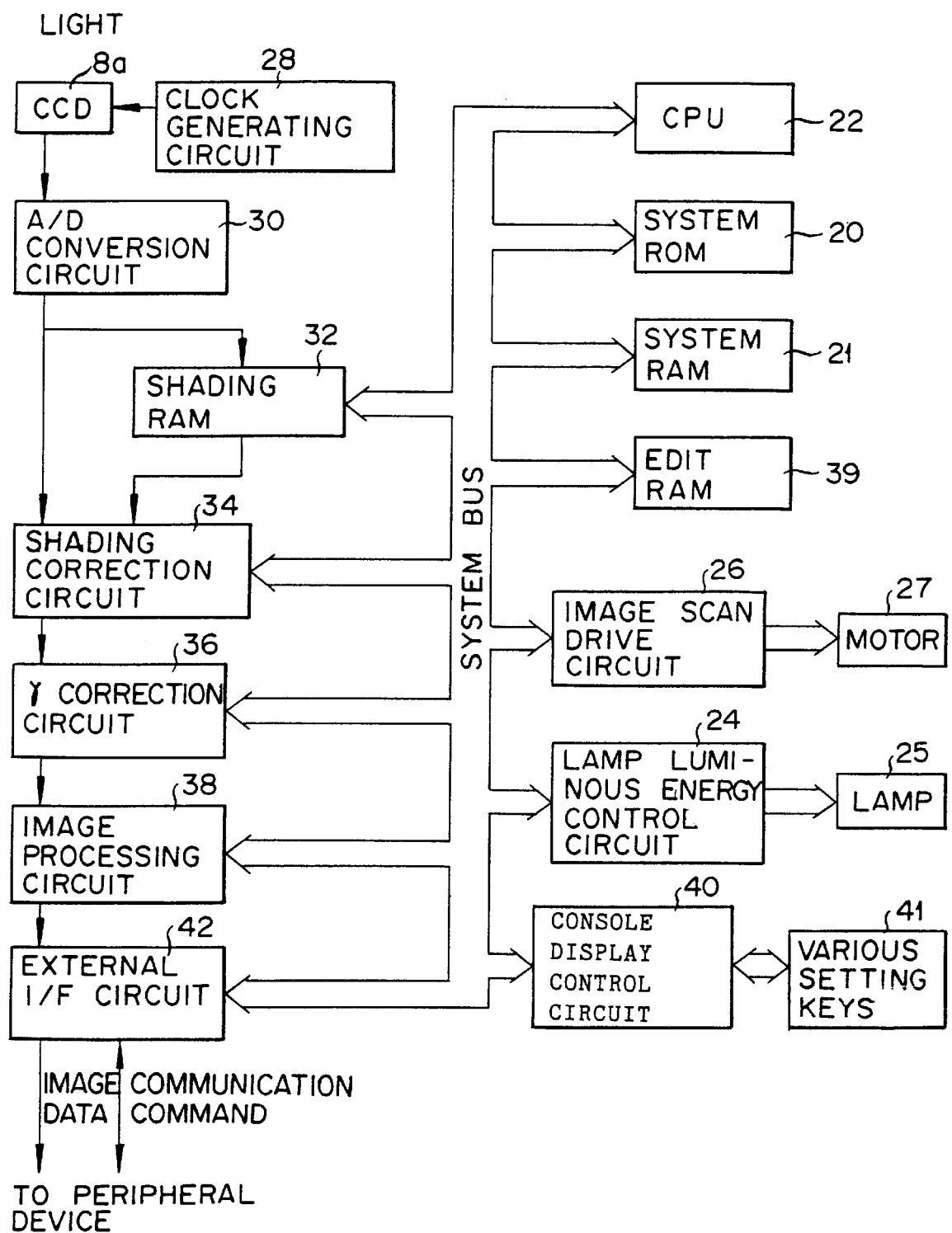
FIG. 3 is a block diagram of a control system in the image processing apparatus according to this invention.

FIG. 3 is a block diagram showing the control system in the image processing apparatus according to this invention.

When a power source for the image processing apparatus is turned on, a control program written in a system ROM 20 is executed to start the operation of the apparatus. At this time, reading and writing concerning the RAMs and the ports are executed by a CPU 22.

The CPU 22 functions concurrently as a contrast calculating means, density setting means, adjustment width setting means and density adjusting means. A system RAM 21 serves to store data on control during the operation of the apparatus and data obtained during pre-scan.

A lamp luminous energy control circuit 24 functions as a density adjusting means. This circuit serves the purpose of setting the luminous energy of a lamp 25 at the intensity which is necessary for image reading. The magnitudes of luminous energy necessary for such occasions as reading, pre-scan, and main scan which are calculated by the CPU 22 are set by this circuit 24.

An image scan drive circuit 26 is a control circuit for controlling the scan mirror 3 to produce a scanning motion during image reading. The scan mirror 3 is driven by a motor 27 at various by-scanning speeds such as variable powers, which are calculated by the CPU 22.

A CCD sensor 8a which constitutes itself the line sensor 8 functions as a image reading means and serves the purpose of causing photoelectric conversion of the light passing the film 1 during image reading, based on the clock signal from a clock generating circuit 28 and consequently outputting image data as analog signals.

An A/D conversion circuit 30 serves the purpose of converting the image data from the CCD sensor 8a into an 8-bit digital signal and outputting this signal.

A shading RAM 32 serves the purpose of storing the result of the monochrome data shading correction executed concerning the individual picture elements of the CCD sensor 8a attached in advance to the apparatus. Incidentally, the density adjustment by the CPU 22 may be utilized for adjusting the density of an image by varying the integral action time of the CCD sensor 8a.

A shading correction circuit 34 functions to correct digital data of each image obtained from the A/D conversion circuit 30 in accordance with correction data stored in the shading RAM 32.

A γ correction circuit (density conversion circuit) 36 serves as an adjustment width setting means generally by functioning to effect conversion of the digital output data of the A/D conversion varying in the form of an exponential function relative to a film density into digital output data linear relative to the film density.

An image processing circuit 38 functions to fulfill such image processing operations as setting an edit RAM 39 in the output area, carrying out negative/positive inversion, and edge enhancement.

A console display control circuit 40, in a system of such a construction as is directly connected to a printer, serves the purpose of detecting the state selected by the operator for setting or changing a required image reading function by means of varying setting keys 41 as adjusting means for the apparatus and displaying the selected setting. Incidentally, the various setting keys 41 include a key for fine adjustment of the automatic exposure control (AE).

An external I/F circuit 42 serves the purpose of controlling the transmission of image data to peripheral output devices (such as the LBP and the computer) or the transmission and reception of various setting commands while the apparatus is connected to the computer.

The image processing apparatus of this invention is provided with an automatic exposure control system (AE). This AE forms a control system for automatically setting the optimum amount of exposure of an image as a target based on the pre-scan data.

Since the contrast of an original image and the operator's taste in image widely vary, however, the amount of exposure automatically set by the AE possibly fails to conform with the operator's wish. The microfilm scanner, therefore, is vested with a manual exposure setting (ME) mechanism or a fine adjustment mechanism of automatic exposure (AE) as an auxiliary function. Thus, the operator is enabled to set by himself a desired amount of exposure. This manual exposure setting is so adapted as to be effected by the operator with the aid of the console display of the scanner or the scanner setup menu in the application software for image reading which is operated on a computer. Generally, the output density can be changed stepwise by a LED indicator or through numerical value input.

If the step of manual exposure is changed while the amount of change in density per step of the exposure is set at a fixed value, the change in density which is consequently effected will unfortunately turn out to be unduly large for low-grade images of an extremely low contrast, although it may be adequate for original images of ample contrast.

Figure 4:
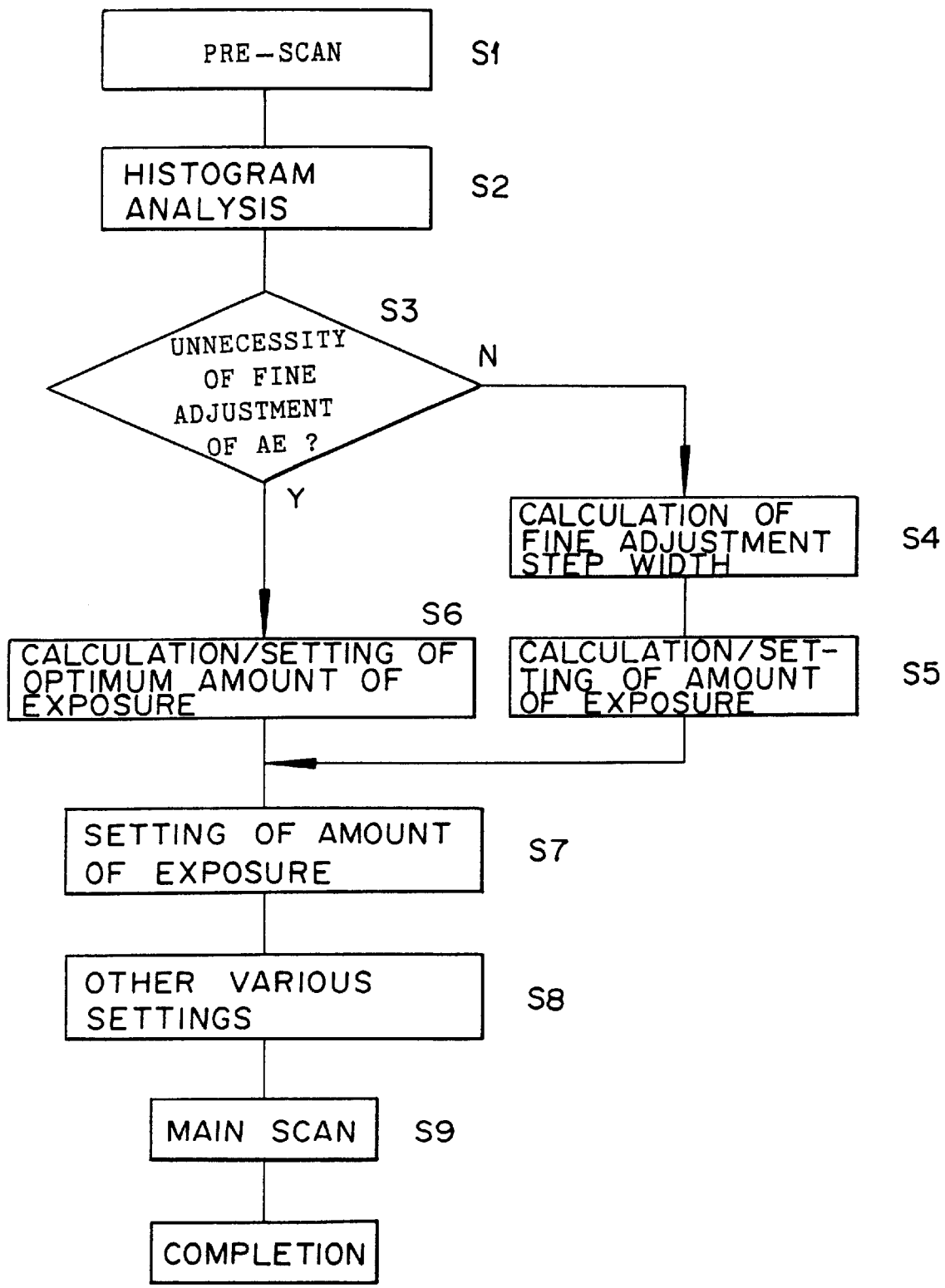
FIG. 4 is a flow chart showing the operation of the image processing apparatus according to this invention.

This invention, in causing a manual change in the amount of exposure (fine adjustment of AE), contemplates obtaining a change of exposure adequate for an original image by enabling the amount of change in density per step to be automatically varied based on the contrast of the original image. Now, the operation of the image processing apparatus of this invention will be described more specifically below based on the flow chart of FIG. 4.

S1: Pre-scan

First, the pre-scan is performed with a view to obtaining data concerning the density, contrast, etc. of a film to be read out.

This pre-scan is carried out for the purpose of detecting the trend on the density of a photographed image in a target film (hereinafter referred to as "film density"). It does not need to obtain the whole data of the area to be read out but may be accomplished by sampling data at rough patches of about 1 mm, for example.

The following parameters are set in advance of the execution of the pre-scan. Incidentally, these parameters are stored in advance in the system ROM 20 and are retrieved during the pre-scan.

(1) Luminous Energy of Lamp

The luminous energy of the lamp 25 during the pre-scan is determined immediately before the output of the CCD sensor 8a enters the state of saturation in the absence of a film so as to ensure faithful conformity with the film density in the widest possible extent.

(2) Speed of Scanning

This speed is set at such a sub-scanning speed which permits collection of data at a required sampling pitch.

(3) Selection of Density Conversion (γ Curve)

The transmission-density conversion (γ curve) for use in the pre-scan is set. By effecting this conversion, it is made possible to obtain a linear output in response to the transmittance (luminous flux density of the surface of the CCD sensor 8a).

Figure 5:
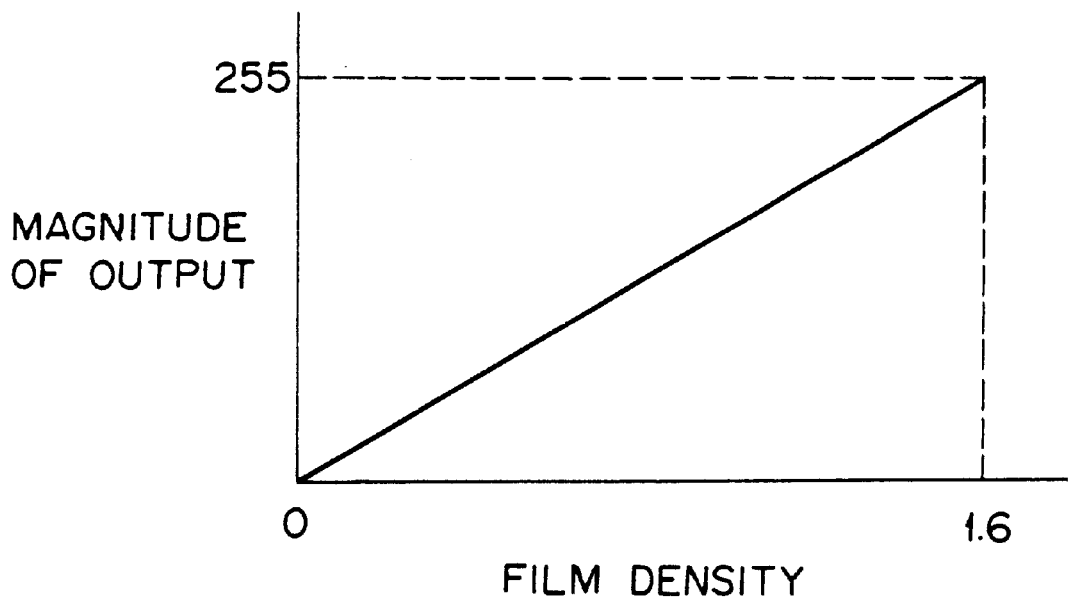
FIG. 5 is a diagram showing one example of the γ curve to be used for the processing of density change during a pre-scan.

During the pre-scan, the inclination of the γ curve is decreased so as to allow recognition of the film density in a relatively wide range. When such a γ curve as is shown in FIG. 5 is used, for example, a linear digital output value of 0 to 255 is obtained for a film density of 0 to 1.6.

The pre-scan is carried out after these parameters have been set. The digital output data which are obtained by the pre-scan are stored in part of the system RAM 21. The density adjustment may be made by changing the integral action time of the CCD sensor 8a which functions as image reading means.

S2: Analysis by Histogram

Analysis with a histogram is carried out on the image to be read out based on the data obtained by the pre-scan at the step of S1. This analysis is executed by the CPU 22.

(1) Formation of Histogram

The data obtained by the pre-scan are examined to determine the frequency of the individual digital output data (0–255). A review of this histogram permits detection of the density of the base and that of the image in the photographed image of a target film.

(2) Calculation of Density of Image Formed Part and Density of Blank Base Part

Figure 6:
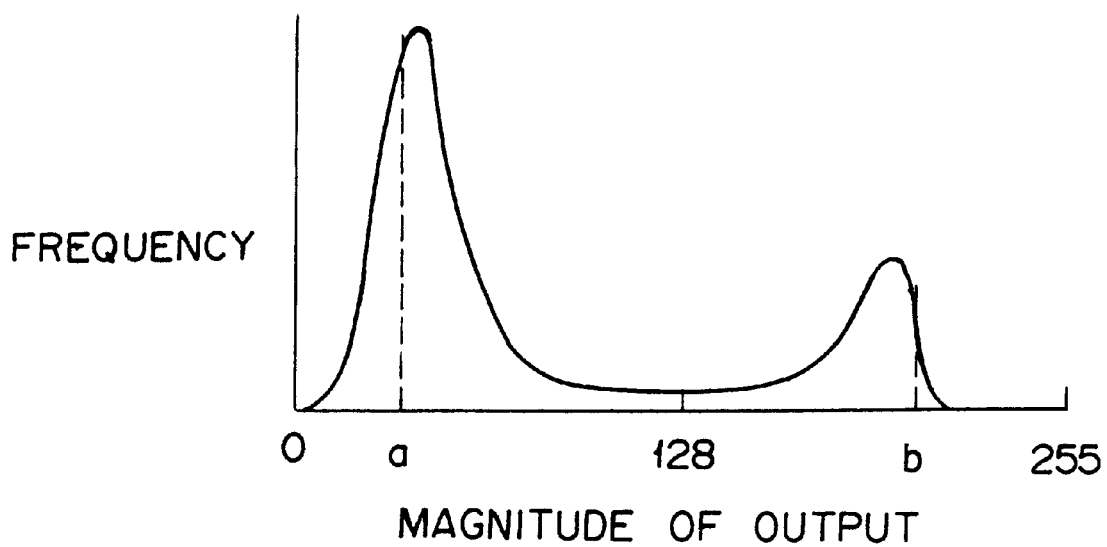
FIG. 6 is a diagram showing one example of a histogram based on an image to be read out.

The histogram obtained in (1) above as shown in FIG. 6 is analyzed to determine the density of the image formed part (Dimg) and the density of the blank base part (Dbas) of the photographed image in the target film respectively from the maximum and the minimum value of the digital output.

In the case of the histogram of FIG. 6, these magnitudes are found from the following expressions.

$$Dbas = (1.6/255) \times a$$

$$Dimg = (1.6/255) \times b$$

(3) Calculation of Contrast

On the basis of the density of the image formed part (Dimg) and the density of the blank base part (Dbas) obtained as described above, the contrast (Dcnt) is calculated as the absolute value of the expression, Dcnt=Dbas–Dimg.

S3: Judgment of Fine Adjustment of AE

The question as to whether the results of the analysis of the histogram indicate the necessity for fine adjustment of AE or not is judged by the CPU 22.

S4: Calculation of Width of Fine Adjustment Step

In preparation for the execution of the fine adjustment of AE, the density to be changed per step is calculated, based on the data obtained by the pre-scan. This calculation is also carried out by the CPU 22.

Figure 7A:
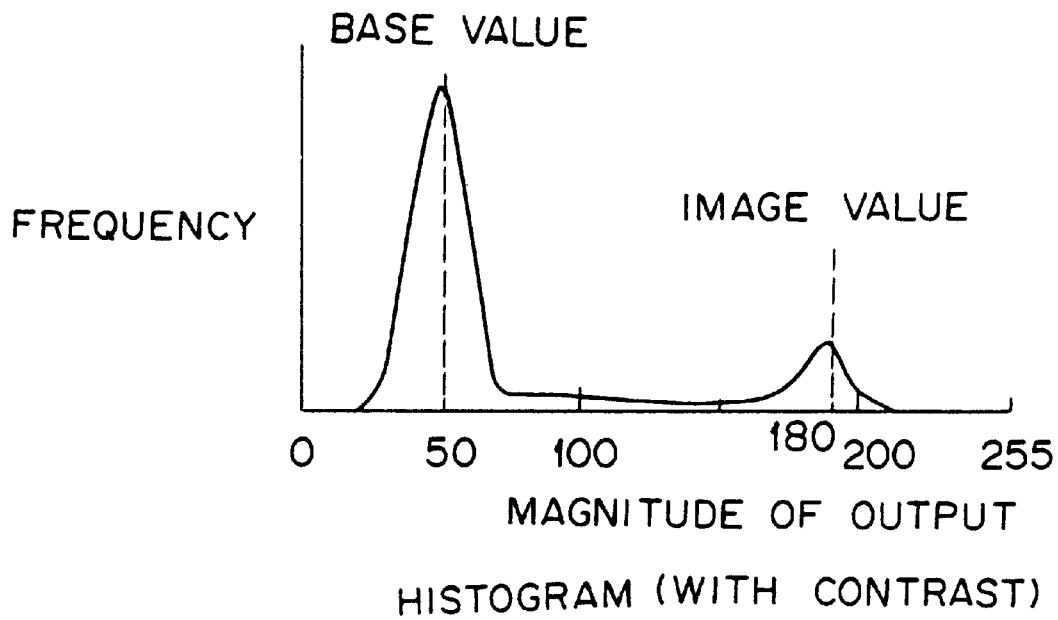
FIGS. 7(A) and (B) are diagrams showing histograms respectively of an original image having a contrast and an original image having no contrast.
Figure 8:
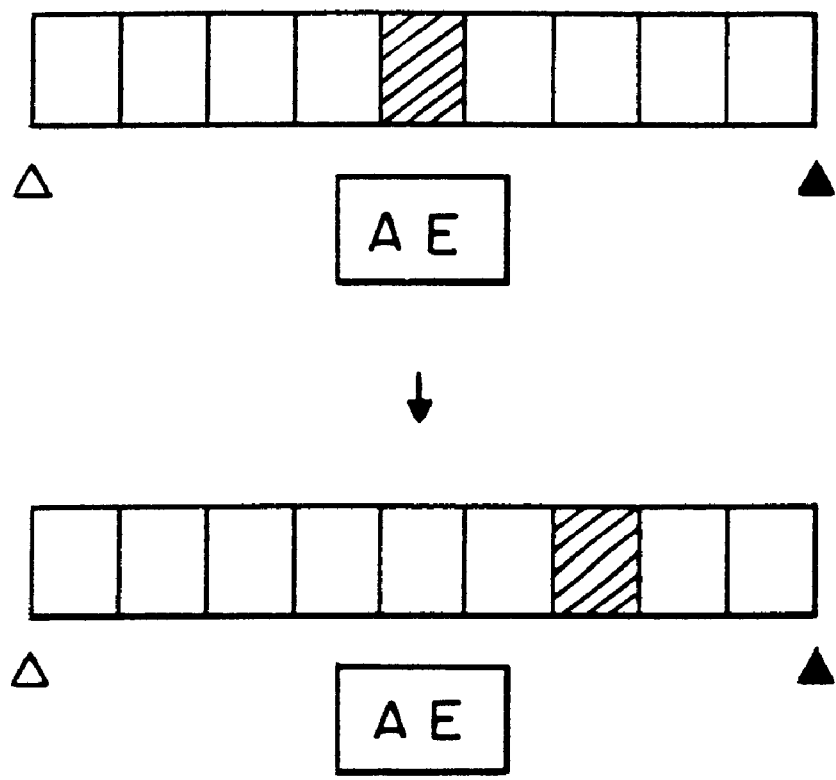
FIG. 8 is a diagram showing the state of setting fine adjustment of AE.

Now, the case of increasing the density by two steps as a set value within the width of the adjustment consisting of a total of nine steps (Center ±4) as shown in FIG. 8 with respect to original images which produce such histograms as are shown in FIGS. 7(A) and (B) as in consequence of the pre-scan will be described below by way of example.

In the case of the original image producing the histogram data of FIG. 7(A), the base density is found as 1.6/255×50= 0.31 because the base value is 50 and the image density is found as 1.6/255×180=1.13 because the image value is 180.

The contrast in this case, therefore, is found as 1.13–0.31=0.82.

Let the statement "only the density equivalent to 50% of the image contrast is changed in the whole range of steps which is the width of fine adjustment of AE" specify the contrast, and the step width will be found simply by calculating the expression 0.82×0.5/(9–1). This means that the fine adjustment per step causes as small a change in density as about 0.05.

Figure 7B:
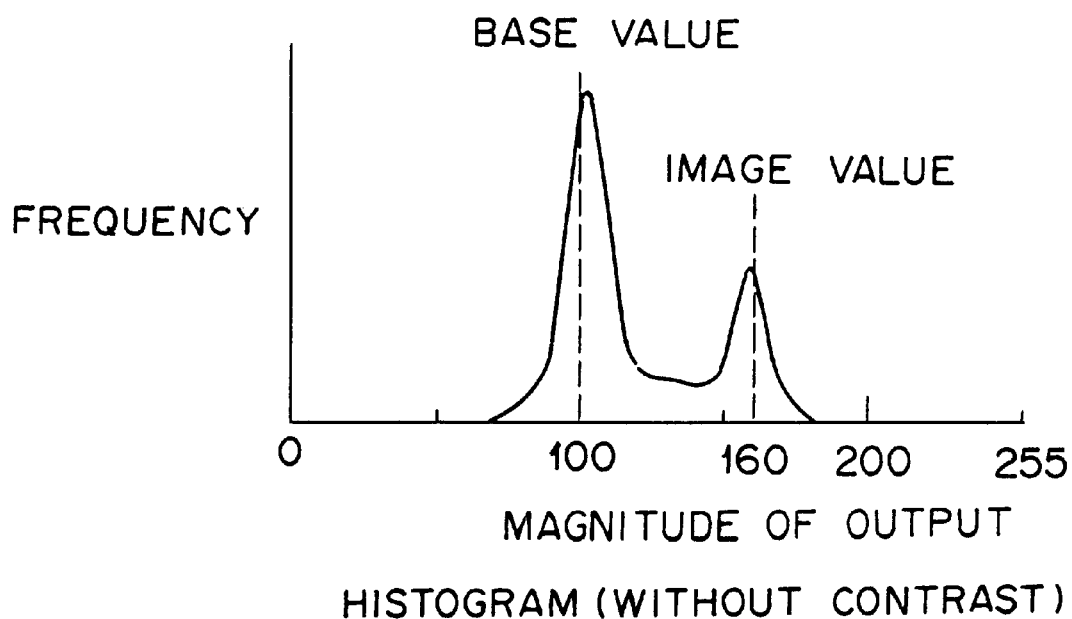

In the case of the original image producing the histogram data of FIG. 7(B), the base density is found as 1.6/255× 100=0.63 because the base value is 100 and the image density is found as 1.6/255×160=1.00 because the image value is 160. It follows as a consequence that the contrast is found as 1.00–0.63=0.37.

Let the aforementioned statement specify the scanner, and the step width will be found by simply calculating the expression 0.37×0.5/(9–1). This means that the fine adjustment per step causes as small a change in density as about 0.02.

S5, S6: Calculation/Setting of Amount of Exposure

The amount of exposure to be actually set will be calculated based on the "amount of change in density per step" which has been calculated as described above. This calculation is also executed by the CPU 22.

In the case of FIG. 8, since a shift by "+2" is effected from the central value of AE in the direction of darkening the output, it suffices to set the amount of exposure as shown below.

In the case of the original image producing the histogram data of FIG. 7(A), the amount of exposure is the sum of (amount of exposure of AE) and (amount of exposure for darkening the density by the product of 0.05×2).

In the case of the original image producing the histogram data of FIG. 7(B), the amount of exposure is the sum of (amount of exposure of AE) and (amount of exposure for darkening the density by the product of 0.02×2).

S7: Setting of Amount of Exposure

The amount of the exposure calculated as described above is set in the lamp luminous energy control circuit 24.

S8: Other Setting

The CPU 22, after the foregoing parameters have been all set, prepares itself for the main scan.

Figure 9:
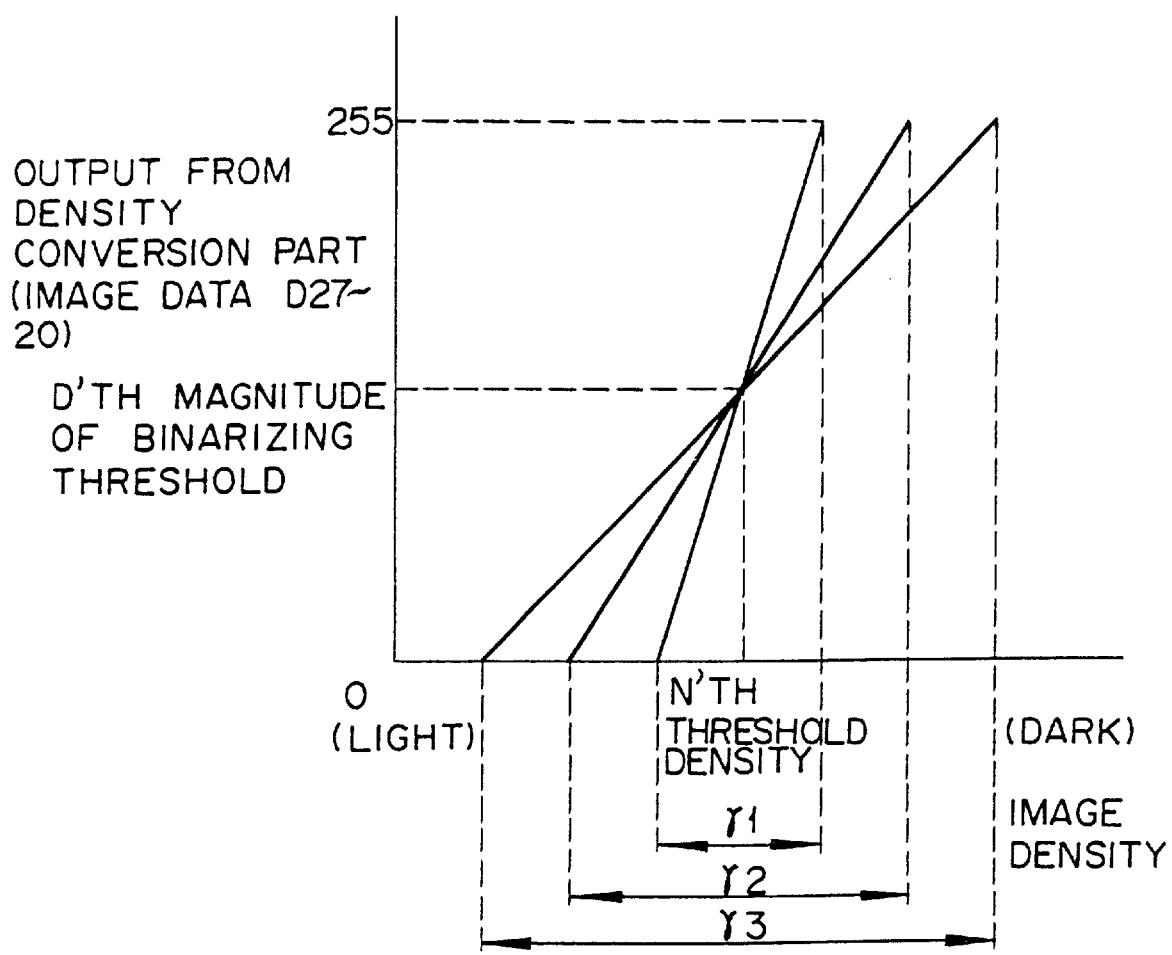
FIG. 9 is a diagram showing one example of the γ curve to be used during a main scan.

Specifically, the γ curve shown in FIG. 9 is set prior to the main scan, unlike the pre-scan.

Figure 10:
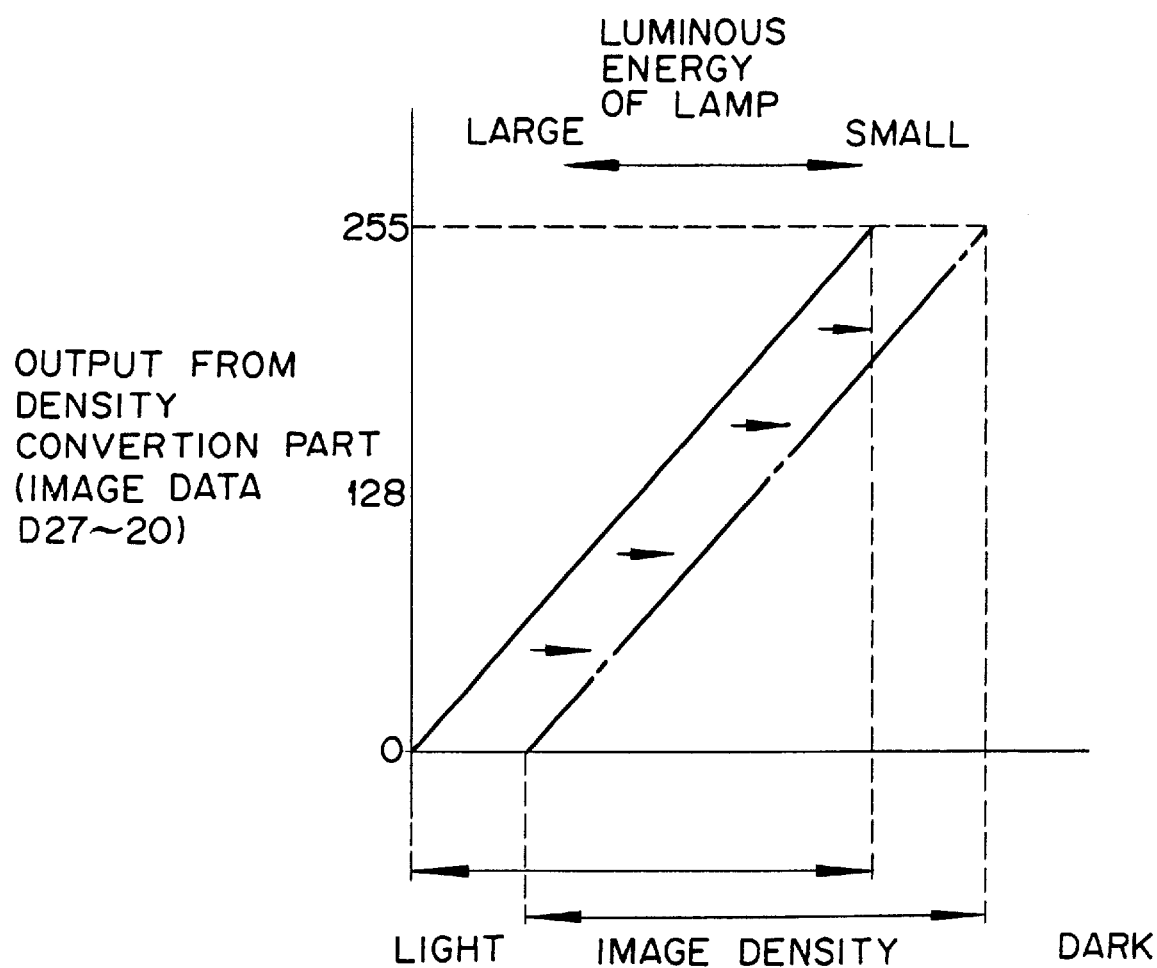
FIG. 10 is a diagram for explaining the fact that the shift of the γ curve is equivalent to the change in the amount of luminous energy of a lamp.

Incidentally, by changing the inclination of this γ curve as shown in the diagram prior to the main scan, it is made possible to alter the adjustment width of the density. For example, the same effect as is derived by changing the luminous energy of the lamp 25 as described above is attained by using a conversion table of the γ curve of a large inclination for original images of small contrast while using a conversion table of the γ curve of a small inclination for original images of large contrast. This is because changing the luminous energy of the lamp 25 in conformity with the set value of density as shown in the graph of FIG. 10 is equivalent to fixing the luminous energy of the lamp and then changing the threshold density by shifting the γ curve as shown in the diagram.

S9: Main Scan

The CPU 22 starts the main scan by causing the image scan drive circuit 26 to rotate the motor 27 and operating the lamp luminous energy control circuit 24. At this time, the lamp luminous energy control circuit 24 causes the luminous energy of the lamp corresponding to the amount of exposure calculated by the AE to be increased (or decreased) by such a luminous energy of the lamp as is required for inducing the change in density mentioned above, and lights the lamp 25 by the luminous energy mentioned above during the main scan.

By forming the histogram concerning the density of an original image to be read in, calculating the contrast based on this histogram, and fixing the step width of density by equally dividing the contrast to be found by calculation as described above, this invention enables the amount of change in density per step to conform faithfully with the contrast of the original image and thereby permits production of a copied image of due density irrespective of the degree of contrast.

It should be understood that the invention is not limited to the particular embodiments shown and described herein, but that various changes and modifications may be made without departing from the spirit and scope of this novel concept as defined by the claims to be set forth herein below. While the preceding embodiment represents a case of effecting the adjustment of copy density by changing the luminous energy of the lamp or shifting the γ conversion table, this adjustment may be otherwise attained as by rendering the gain of the CCD sensor 8a variable or the amplifier output of the CCD sensor 8a variable.

What is claimed is:

1. A method of adjusting density in an image reading apparatus, said apparatus allowing the adjustment of density in increments, comprising the steps of:
    reading an image to produce electrical signals;
    calculating a contrast of said read image based on said electrical signals;
    calculating an amount of change in density produced by each increment on the basis of the calculated contrast; and
    adjusting density on of the basis of the calculated amount of change in density produced by each increment.

2. The method of claim 1, wherein the amount of change in density produced by each increment varies directly with the contrast, such that high contrast images have a larger amount of change in each increment than low contrast images.

3. The method of claim 1, wherein the calculating steps are performed in a preliminary scan of the image, prior to a main scan of the image.

4. The method of claim 1, wherein the step of calculating a contrast comprises the steps of:
    forming a histogram based on the electrical signals; and
    detecting a difference between an image formed part and a blank base part from the histogram to provide said contrast.

5. The method of claim 1, wherein the step of adjusting the density is executed by changing a luminous energy of a lamp during image reading.

6. The method of claim 1, wherein the step of adjusting the density is executed by changing a γ conversion table of a γ conversion circuit.

7. The method of claim 1, wherein the step of adjusting the density is executed by changing an integral action time for the step of reading.

8. The method of claim 1, wherein the step of adjusting the density is executed by changing an amplification amount in which the image is read out in the step of reading.

9. The method of claim 1, wherein the density adjusting step includes manually inputting each increment by an operator.

10. A method of adjusting density in an image reading apparatus, said apparatus allowing the adjustment of density within a prescribed adjustment width, comprising the steps of:
    reading an image to produce electrical signals;
    calculating a contrast of said read image based on said electrical signals;
    calculating an amount of change in density encompassed by the adjustment width on the basis of the calculated contrast; and
    adjusting density on the basis of the calculated amount of change in density in the adjustment width.

11. The method of claim 10, wherein the amount of change in density associated with the adjustment width varies directly with the contrast, such that high contrast images have a larger amount of change in the adjustment width than low contrast images.

12. The method of claim 10, wherein the calculating steps are performed in a preliminary scan of the image, prior to a main scan of the image.

13. The method of claim 10, wherein the step of calculating a contrast comprises the steps of:
    forming a histogram based on the electrical signals; and
    detecting a difference between an image formed part and a blank base part from the histogram to provide said contrast.

14. The method of claim 10, wherein the step of adjusting the density is executed by changing a luminous energy of a lamp during image reading.

15. The method of claim 10, wherein the step of adjusting the density is executed by changing a γ conversion table of a γ conversion circuit.

16. The method of claim 10, wherein the step of adjusting the density is executed by changing an integral action time for the step of reading.

17. The method of claim 10, wherein the step of adjusting the density is executed by changing an amplification amount in which the image is read out in the step of reading.

18. The method of claim 10, wherein the density adjusting step includes manually adjusting the density in increments.

19. An image reading apparatus, comprising:
    a selection means for allowing a user to select an incremental change in density;
    reading means for reading an image to produce electrical signals;
    calculating means for calculating a contrast of said read image based on said electrical signals, and for calculating an amount of change in density produced by each increment on the basis of the calculated contrast; and
    adjusting means for adjusting density on the basis of the calculated amount of change in density produced by each increment.

20. The apparatus of claim 19, wherein the amount of change in density produced by each increment varies directly with the contrast, such that high contrast images have a larger amount of change in each increment than low contrast images.

21. The apparatus of claim 19, wherein the calculating means performs its calculations in a preliminary scan of the image, prior to a main scan of the image.

22. The apparatus of claim 19, wherein the calculating means comprises means for forming a histogram based on the electrical signals, and detecting a difference between an image formed part and a blank base part from the histogram to provide said contrast.

23. The apparatus of claim 19, further including a lamp, wherein the adjusting means adjusts the density by changing a luminous energy of the lamp during image reading.

24. The apparatus of claim 19, further including a γ conversion circuit, wherein the adjusting means adjusts the density by changing a γ conversion table of the γ conversion circuit.

25. The apparatus of claim 19, wherein the adjusting means adjusts the density by changing an integral action time of said reading means.

26. The apparatus of claim 19, wherein the reading means employs an amplifier for controlling an amplification amount of a read out image, wherein the adjusting means adjusts the density by changing the amplification amount.

27. An image reading apparatus, comprising:
- a selection means for allowing a user to select a change in density within a prescribed adjustment width;
- reading means for reading an image to produce electrical signals;
- calculating means for calculating a contrast of said read image based on said electrical signals, and for calculating an amount of change in density encompassed by the adjustment width on the basis of the calculated contrast; and
- adjusting means for adjusting density on the basis of the calculated amount of change in density in the adjustment width.

28. The apparatus of claim 19, wherein the amount of change in density associated with the adjustment width varies directly with the contrast, such that high contrast images have a larger amount of change in the adjustment width than low contrast images.

29. The apparatus of claim 19, wherein the calculating means performs its calculations in a preliminary scan of the image, prior to a main scan of the image.

30. The apparatus of claim 27, wherein the calculating means comprises means for forming a histogram based on the electrical signals, and detecting a difference between an image formed part and a blank base part to provide said contrast.

31. The apparatus of claim 27, further including a lamp, wherein the adjusting means adjusts the density by changing a luminous energy of the lamp during image reading.

32. The apparatus of claim 27, further including a γ conversion circuit, wherein the adjusting means adjusts the density by changing a γ conversion table of the γ conversion circuit.

33. The apparatus of claim 27, wherein the adjusting means adjusts the density by changing an integral action time of said reading means.

34. The apparatus of claim 27, wherein the reading means employs an amplifier for controlling an amplification amount of a read out image, wherein the adjusting means adjusts the density by changing the amplification amount.

* * * * *